United States Patent Office 3,537,329
Patented Nov. 3, 1970

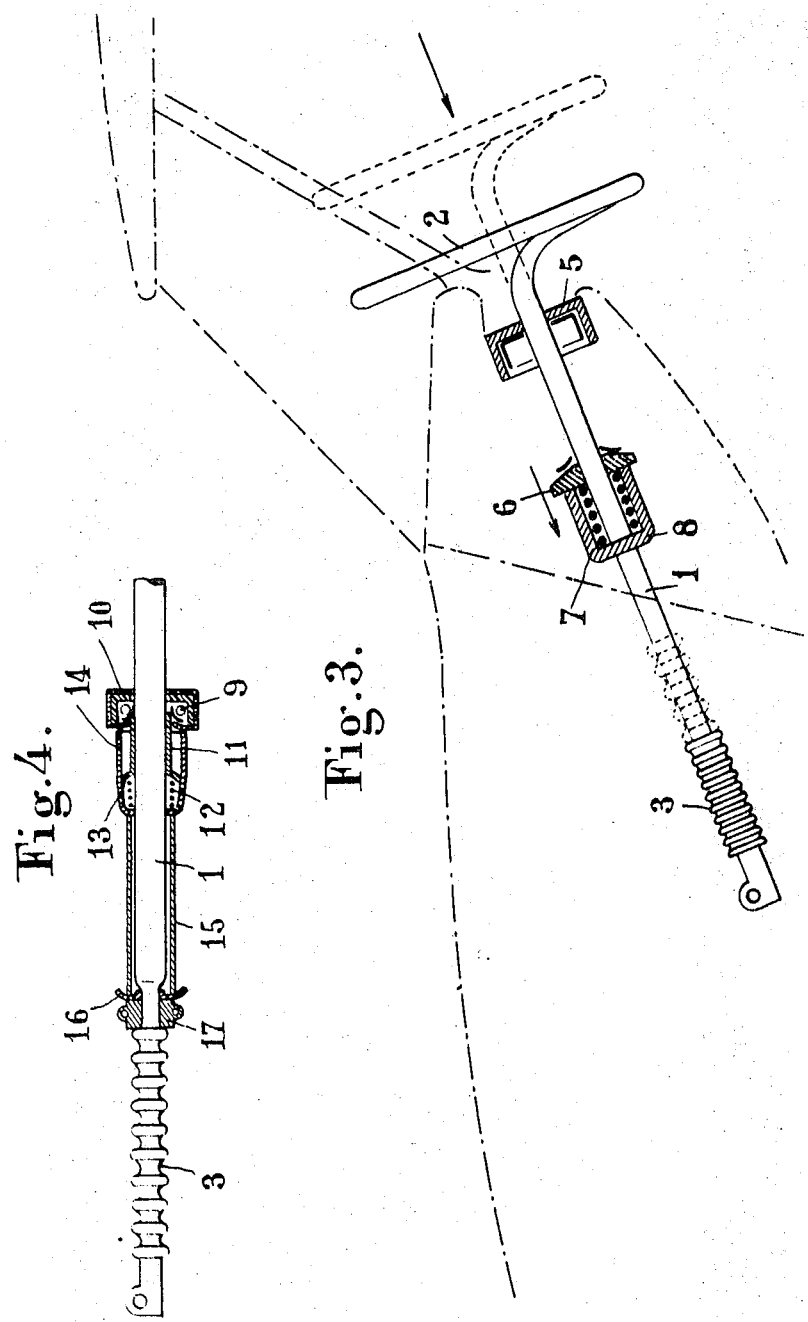

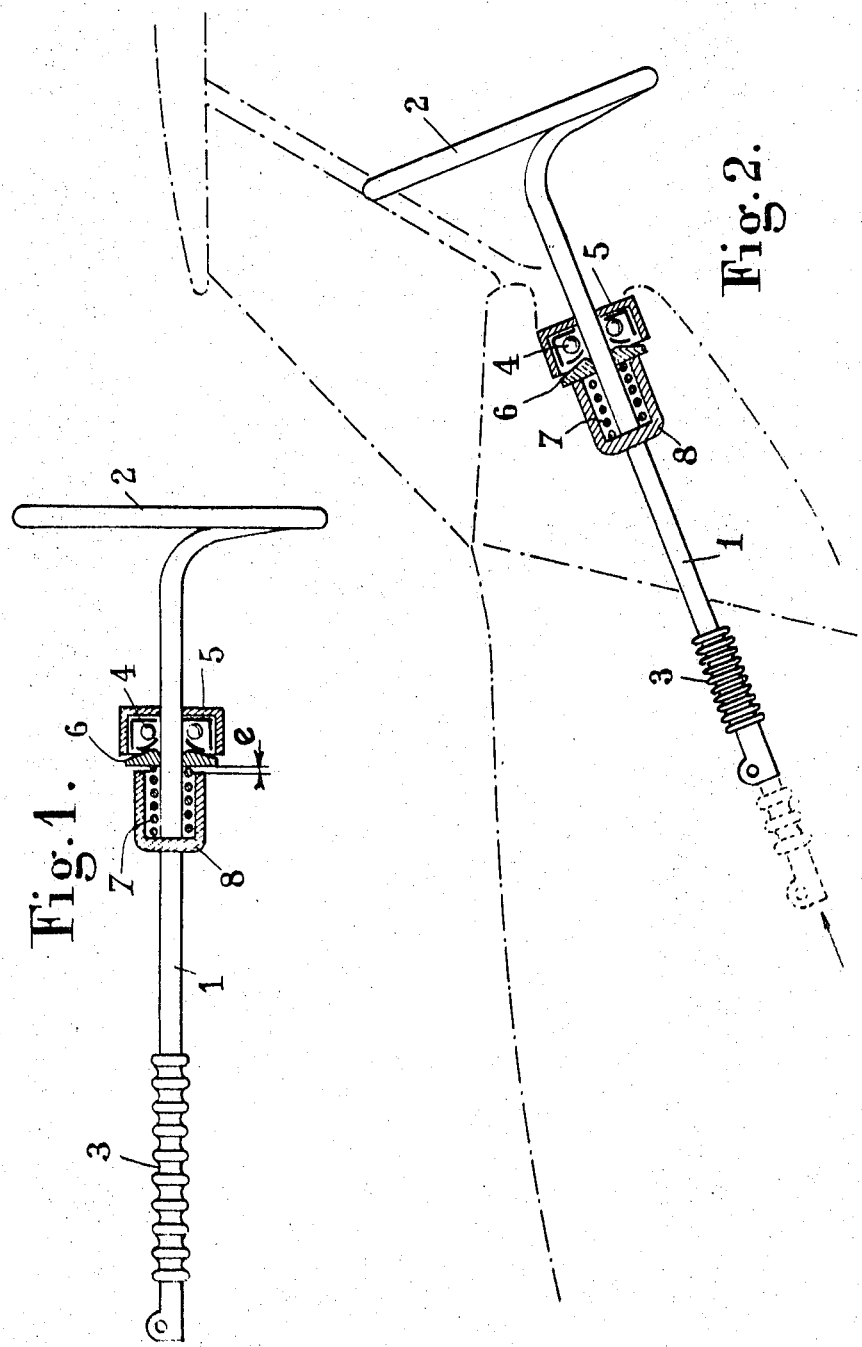

3,537,329
STEERING COLUMN HAVING AN IMPACT ABSORBING CONTRACTIBLE PORTION
Raymond A. Ravenel, Sceaux, France, assignor to Societe Anonyme Andre Citroen, Paris, France, a company of France
Filed July 2, 1968, Ser. No. 742,016
Claims priority, application France, July 13, 1967, 114,337, Patent 1,539,058
Int. Cl. B62d 1/18
U.S. Cl. 74—492                            4 Claims

ABSTRACT OF THE DISCLOSURE

A steering rod is provided with a contractible portion adapted to absorb some of the kinetic energy developed by an impact while continuing to be capable of being used for steering the vehicle. It comprises an upper portion connected to a steering wheel and a lower portion contractible in cooperation with separable thrust bearing in which the rear end of the steering rod is mounted. The thrust bearing functions to permit free sliding movement of the steering rod in the forward direction and prevents any axial sliding movement of the steering rod in the backward direction.

BACKGROUND OF THE INVENTION

This invention relates to steering columns of automotive vehicles and has specific reference to steering column arrangements designed to collapse when loaded from either end, for safety purposes.

In fact, to avoid injuries caused by steering columns likely to stave in the driver's chest in case of crash, means have already been proposed for imparting a telescopic characteristic to these columns; actually, this solution may reduce to a considerable extent the gravity of injuries in case of road casualty but on the other hand its construction is both costly and delicate.

To simplify the design it has also been proposed to interpose between the steering wheel and the steering column a deformable member of which the compressive strength increases as it is deformed; therefore, this member is capable of damping out the shock exerted by the driver's chest against the steering column; yet the maximum permissible stroke is most likely to prove inadequate for efficiently protecting the driver in case of very strong shock.

SUMMARY OF THE INVENTION

It is the essential object of the present invention to provide a steering column for automotive vehicle which comprises a minimum number of parts, is easy to manufacture and assemble, and therefore of moderate cost, and nevertheless it is extremely efficient and reliable.

To this end, according to a first feature characterizing this invention, the steering column for automotive vehicle comprises at its lower end a relatively long section having a bellows-like corrugated wall; the entire column portion extending between the ends of this section can collapse like a bellows when axially loaded from either end, and thus absorb one fraction of the kinetic energy developed by the crash or shock; even then, it can still be used for steering the vehicle.

According to another feature characterizing this invention, the front section of the steering column, i.e. the section adjacent to the steering wheel, is mounted in a thrust bearing so arranged as to permit the free sliding movement of this column in the forward direction and, on the other hand, to prevent any sliding movement thereof in the backward direction, i.e. towards the driver. Thus, if the circumstances of the crash are such that it is the driver's body that is thrown by the kinetic energy forwards or against the steering wheel, the resulting thrust will firstly cause the steering column to slide forwards, thereby causing its complete lower section, i.e. the section having a corrugated wall, to collapse; on the other hand, if the circumstances of the crash are such that it is the steering column that tends to move backwards, towards the driver's chest, any sliding movement of the column in said thrust bearing is positively prevented and it is the front section of the column, which comprises said corrugated wall, that collapses first, as its strength is lower than that of said thrust bearing.

BRIEF DESCRIPTION OF THE DRAWING

The attached drawing illustrates diagrammatically the basic principle of this invention and a typical form of embodiment thereof, given by way of example. In the drawing:

FIG. 1 is a part-sectional side view of the steering column with its mounting thrust bearing;

FIGS. 2 and 3 show the steering column mounted on an automotive vehicle and the manner in which it behaves according to crash circumstances; and FIG. 4 shows a typical form of embodiment of the steering column.

DESCRIPTION OF THE PREFERRED EMBODIMENT

The steering column or rod 1 illustrated in the drawing comprises a steering wheel 2 and at its lower or front portion a contractible section 3 having a bellows-like corrugated wall; this column is supported and guided at its upper portion by a separable thrust bearing which comprises a ball-bearing 4 mounted in a case or casing 5 adapted to be fastened to the frame structure or body of the vehicle, and a bearing flange or retainer 6 consisting in the example illustrated of a tapered ring is adapted to slide freely along the steering column and urged for engagement with the anti-friction elements of the ball-bearing 4 by a spiral spring 7 housed in an open-ended spring retaining case or casing 8 rigid with the steering column 1.

As shown in FIG. 2, if the circumstances of a crash are such that the shock resulting therefrom tends to push the steering column backwards, i.e., if an axial impact force is applied in the direction shown by the arrow, after an initial axial movement corresponding to the play e left between the bearing case 8 and the bearing flange 6, any subsequent sliding movement is prevented by the bearing 5 and the entire lower section 3 having the corrugated wall will collapse like a bellows under constant load, thus avoiding a widespread deformation.

Obviously, even in case of a force greater than the damping capacity of the safety corrugated sleeve thus constituted, the body injuries to the driver as well as material damages to the vehicle are reduced to a substantial extent.

The very design of this bellows enables it to cope with the most diversified crash conditions, the corrugated contour affording a wide range of unbalanced deformations while preserving the stiffness of a conventional tube as required for transmitting a control torque.

In contrast thereto, if as illustrated in FIG. 3 the crash takes place under such circumstances that the shock is applied in the forward direction, i.e., if an axial impact force is applied in the direction shown by the arrow, as a consequence of the driver being thrown by the kinetic energy against the steering wheel, the column 1 can slide freely through the bearing 5, due to the separation or unseating of the thrust bearing which is caused by the backward movement of the bearing flange 6 associated therewith, as well as of spring 7 and case 8 solid with the steering column 1 of which the lower section 3 will collapse as in the preceding example when said energy oversteps a predetermined threshold, by absorbing proportionally the value of the work produced without constant load.

The form of embodiment illustrated in FIG. 4 is a typical example of a mounting designed for a commercial application, the steering column 1 and its section 3 formed with the corrugated wall being substantially the same as those shown in FIG. 1; in this example, a sliding ring 11 is interposed between the bearing 9 and the coil compression spring 12 reacting with one end against a cup-shaped extension 13 of ring 11 and with the opposite end against the bottom of the annular case 14 also surrounding the annular ring 11; a tubular distance-piece 15 is interposed between the bottom of the annular case 14 and the abutment cup 16 bearing against a stop collar 17.

It will be readily understood that the form of embodiment of the invention which is described hereinabove with reference to the accompanying drawing is given by way of example and not of limitation, and that many modifications and variations may be brought thereto without departing from the spirit and scope of the invention as set forth in the appended claims; Thus, notably, the number of bearings holding the device in position may be increased if desired; besides, additional members may be provided for avoiding vibration or flexion effects; thus, for instance, a simple intermediate centering ring may be interposed between the upper bearing and the deformable section to avoid a buckling effect in case of lateral effort.

What I claim is:

1. An impact absorbing steering column comprising: a steering wheel, a steering column connected to said steering wheel having a collapsible lower portion, said collapsible lower portion comprising collapsible bellows-like corrugated walls operative to transmit rotational movement of said steering wheel even when collapsed, and separable bearing means mounting said steering column in the vicinity of the steering wheel permitting free sliding movement of said steering wheel in the forward direction accompanied by separation of said separable bearing means in response to impact loads axially applied to said steering column in the forward direction and preventing any axial sliding movement thereof in the backward direction in response to impact loads applied to said steering column in the backward direction.

2. An impact absorbing steering rod comprising: a rotatably mounted steering rod for transmitting rotary motion including contractible means intermediate opposite ends thereof axially contractible in response to impact loads axially applied to either end of said steering rod; a steering wheel connected to one end of said steering rod; and a separable thrust bearing having cooperating thrust elements, one of said thrust elements being connected to said steering rod, separable in response to impact loads axially applied to said steering rod in a first direction away from said steering wheel and toward the opposite end effective to contract said contractible means.

3. A steering rod according to claim 2; wherein said cooperating thrust elements comprise first casing means fixedly positioned with respect to said steering rod for slidably mounting said steering rod; and second casing means mounted on said steering rod normally engageable with said first casing means and separable away therefrom in response to impact loads axially applied to said steering rod in said first direction.

4. A steering rod according to claim 3; wherein said separable thrust bearing further includes axially displaceable anti-friction elements within said first casing rotatably mounting said steering rod; and wherein said second casing comprises means slidable along said steering rod engageable with said anti-friction elements for preventing axial displacement thereof in the absense of impact loads axially applied to said steering rod in said first direction, and biasing means for normally biasing said last-mentioned means into engagement with said anti-friction elements.

References Cited

UNITED STATES PATENTS

| | | | |
|---|---|---|---|
| 2,079,536 | 5/1937 | Thurber | 74—493 |
| 3,016,764 | 1/1962 | Fredericks et al. | 74—552 |
| 3,167,974 | 2/1965 | Wilfert | 74—552 |
| 3,434,367 | 3/1967 | Renneker et al. | 74—492 |
| 3,401,576 | 9/1968 | Eckels | 74—493 |

MILTON KAUFMAN, Primary Examiner